United States Patent
Au et al.

(10) Patent No.: US 11,051,257 B2
(45) Date of Patent: Jun. 29, 2021

(54) SYSTEM AND METHOD OF CONFIGURABLE SEQUENCE USAGE FOR TRANSMISSION RECEPTION POINTS

(71) Applicant: Huawei Technologies Co., Ltd., Shenzhen (CN)

(72) Inventors: Kelvin Kar Kin Au, Kanata (CA); Liqing Zhang, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 149 days.

(21) Appl. No.: 16/391,934

(22) Filed: Apr. 23, 2019

(65) Prior Publication Data

US 2019/0253987 A1 Aug. 15, 2019

Related U.S. Application Data

(63) Continuation of application No. 15/593,948, filed on May 12, 2017, now abandoned.

(60) Provisional application No. 62/336,225, filed on May 13, 2016.

(51) Int. Cl.
| | |
|---|---|
| *H04W 52/38* | (2009.01) |
| *H04W 52/24* | (2009.01) |
| *H04W 52/50* | (2009.01) |
| *H04W 56/00* | (2009.01) |

(52) U.S. Cl.
CPC ......... *H04W 52/38* (2013.01); *H04W 52/242* (2013.01); *H04W 52/50* (2013.01); *H04W 56/001* (2013.01); *H04W 56/0015* (2013.01)

(58) Field of Classification Search
CPC ... H04W 52/38; H04W 52/242; H04W 52/50; H04W 56/001
See application file for complete search history.

(56) References Cited

U.S. PATENT DOCUMENTS

| | | | |
|---|---|---|---|
| 9,544,105 B2 | 1/2017 | Siomina et al. | |
| 9,603,062 B2 * | 3/2017 | Horn | H04W 36/00835 |
| 2007/0248068 A1 | 10/2007 | Onggosanusi et al. | |
| 2009/0061864 A1 * | 3/2009 | Sohn | H04L 27/2656 |
| | | | 455/434 |

(Continued)

FOREIGN PATENT DOCUMENTS

| | | |
|---|---|---|
| CN | 1192831 A | 9/1998 |
| CN | 101009513 A | 8/2007 |

(Continued)

*Primary Examiner* — Md K Talukder
(74) *Attorney, Agent, or Firm* — Slater Matsil, LLP (57) ABSTRACT

Systems and methods are provided that allow a transmit receive point (TRP) that is a member of a group of TRPs to convey a characteristic of the group through the transmission of a synchronization sequence. A transmit receive point in a first group of TRPs transmits with a first synchronization sequence. A TRP in a second group of TRPs transmits with a second synchronization sequence, the first and second synchronization sequences being different from each other. The TRPs of the first group share a common first characteristic and the TRPs of the second group share a common second characteristic. The transmission of the first synchronization sequence conveys the first common characteristic, and the transmission of the second synchronization sequence conveys the second common characteristic.

24 Claims, 5 Drawing Sheets

(56) References Cited

U.S. PATENT DOCUMENTS

| | | | |
|---|---|---|---|
| 2009/0129291 A1* | 5/2009 | Gupta | H04W 8/26 370/254 |
| 2009/0135784 A1* | 5/2009 | Horn | H04W 36/0055 370/331 |
| 2009/0137228 A1 | 5/2009 | Horn et al. | |
| 2009/0238149 A1* | 9/2009 | Kawabata | H04W 16/12 370/335 |
| 2010/0135176 A1* | 6/2010 | Kazmi | H04W 24/08 370/252 |
| 2011/0149947 A1* | 6/2011 | Kim | H04W 36/0061 370/350 |
| 2012/0069804 A1* | 3/2012 | Kim | H04W 72/0453 370/329 |
| 2012/0106671 A1* | 5/2012 | Chapman | H04W 28/22 375/295 |
| 2012/0201164 A1 | 8/2012 | Joengren et al. | |
| 2012/0231790 A1 | 9/2012 | Lindoff et al. | |
| 2013/0039195 A1 | 2/2013 | Weng et al. | |
| 2013/0077599 A1* | 3/2013 | Dimou | H04W 36/22 370/331 |
| 2014/0003288 A1 | 1/2014 | Pan et al. | |
| 2015/0181546 A1* | 6/2015 | Freda | H04L 27/0014 370/336 |
| 2016/0029333 A1 | 1/2016 | Seo et al. | |
| 2016/0112998 A1 | 4/2016 | Jongren et al. | |
| 2017/0295551 A1* | 10/2017 | Sadiq | H04L 27/2692 |
| 2017/0332335 A1* | 11/2017 | Au | H04W 56/0015 |
| 2019/0253987 A1* | 8/2019 | Au | H04W 52/242 |

FOREIGN PATENT DOCUMENTS

| | | |
|---|---|---|
| CN | 101541101 A | 9/2009 |
| CN | 101911770 A | 12/2010 |
| CN | 102036295 A | 4/2011 |
| CN | 103052123 A | 4/2013 |
| CN | 103370897 A | 10/2013 |
| CN | 103384366 A | 11/2013 |
| CN | 103548291 A | 1/2014 |
| CN | 103718614 A | 4/2014 |
| CN | 103947253 A | 7/2014 |
| EP | 0872026 B1 | 8/2000 |
| EP | 1530319 A2 | 5/2005 |
| WO | 2014086387 A1 | 6/2014 |

* cited by examiner

SYSTEM AND METHOD OF CONFIGURABLE SEQUENCE USAGE FOR TRANSMISSION RECEPTION POINTS

CROSS-REFERENCE TO RELATED APPLICATIONS

This application is a continuation of U.S. patent application Ser. No. 15/593,948 entitled "System and Method of Configurable Sequence Usage for Transmission Reception Points," filed on May 12, 2017, which claims priority to U.S. Provisional Patent Application No. 62/336,225 entitled "System and Method of Configurable Sequence Usage for Transmission Reception Points," filed on May 13, 2016, which applications are hereby incorporated by reference in their entireties.

TECHNICAL FIELD

The application relates to synchronization mechanisms for hypercells.

BACKGROUND

Conventional synchronization sequences are used by a user equipment (UE) in a wireless network to acquire timing and frequency synchronization with the wireless network, to obtain the OFDM symbol timing (symbol index) relative to a sub-frame, and for the purpose of radio frame timing. In addition, based on the detected sequences, a UE can derive the physical cell identity.

SUMMARY

Systems and methods are provided that allow a transmit receive point (TRP) that is a member of a group of TRPs to convey a characteristic of the group through the transmission of a synchronization sequence.

According to one aspect of the present disclosure there is provided a method comprising: each of at least one transmit receive point (TRP) in a first group of TRPs transmitting with a first synchronization sequence; at least one TRP in a second group of TRPs transmitting with a second synchronization sequence, the first and second synchronization sequences being different from each other; the transmission of the first synchronization sequence conveying a first common characteristic shared by the TRPs of the first group, and the transmission of the second synchronization sequence conveying a second common characteristic shared by the TRPs of the second group.

In some embodiments, the first group of TRPs and the second group of TRPs all have a common cell identifier.

In some embodiments, each hypercell may have a configurable coverage area according to network topology, UE distribution and load distribution, the coverage area being configurable through selection of the TRPs of the hypercell.

In some embodiments, the method further comprises: assigning the first synchronization sequence to the first group; assigning the second synchronization sequence to the second group; selecting the at least one transmit receive point of the first group to transmit with the first synchronization sequence; selecting the at least one transmit receive point of the second group to transmit with the second synchronization sequence.

In some embodiments, the first common characteristic shared by the first group of TRPs is that they are high power TRPs, and the second common characteristic shared by the second group of TPRs is that they are low power TRPs.

According to another aspect of the present disclosure, there is provided a method comprising: at least one transmit receive point (TRP) in a first group of TRPs transmitting with a first synchronization sequence of a first group of synchronization sequences; at least one TRP in a second group of TRPs transmitting with a second synchronization sequence of a second group of synchronization sequences, the first and second group of synchronization sequences being disjoint; the transmission of the first synchronization sequence conveying a first common characteristic shared by the TRPs of the first group, and the transmission of the second synchronization sequence conveying a second common characteristic shared by the TRPs of the second group.

In some embodiments, the method further comprises assigning the first group of synchronization sequences to the first group; assigning the second group of synchronization sequences to the second group; selecting the at least one transmit receive point of the first group to transmit with a synchronization sequence from the first group of synchronization sequences; selecting the at least one transmit receive point of the second group to transmit with a synchronization sequence from the second group of synchronization sequences.

In some embodiments, the first common characteristic shared by the first group of TRPs is that they are high power TRPs, and the second common characteristic shared by the second group of TPRs is that they are low power TRPs.

According to another aspect of the present disclosure, there is provided a system comprising: a plurality of transmit receive points (TRPs); at least one TRP in a first group of TRPs of said plurality of TRPs configured to transmit with a first synchronization sequence; at least one TRP in a second group of TRPs of said plurality of TRPs configured to transmit with a second synchronization sequence, the first and second synchronization sequences being different from each other; the transmission of the first synchronization sequence conveying a first common characteristic shared by the TRPs of the first group, and the transmission of the second synchronization sequence conveying a second common characteristic shared by the TRPs of the second group.

In some embodiments, the system further comprises a controller that configures each TRP to belong to the first group of TRPs or the second group of TRPs.

According to another aspect of the present disclosure, there is provided a method comprising: a user equipment (UE) detecting a synchronization sequence; and based on information associating each of a plurality of synchronization sequences with a respective common characteristic shared by TRPs that transmit the synchronization sequence, the UE determining a characteristic of a source of the detected synchronization sequence based on the detected synchronization sequence.

In some embodiments, the method further comprises determining a cell ID based on transmissions by TRPs, wherein a common cell ID is used for at least two groups of TRPs that transmit different synchronization sequences.

In some embodiments, determining the characteristic comprises: if the synchronization sequence is a first sequence, the UE determining a high power TRP transmitted the synchronization sequence; if the synchronization sequence is a second sequence, the UE determining a lower power TRP transmitted the synchronization sequence.

In some embodiments, determining the characteristic comprises: if the synchronization sequence is a sequence of a first group of synchronization sequences, the UE determining a high power TRP transmitted the synchronization sequence; if the synchronization sequence is a sequence of a second group of synchronization sequences, the UE determining a lower power TRP transmitted the synchronization sequence.

In some embodiments, the method further comprises the UE adjusting power control based on the determination of whether a high power TRP or a low power TRP transmits the synchronization sequence.

In some embodiments, the UE adjusting power control comprises the UE adjusting initial transmit power.

According to another aspect of the present invention, there is provided a user equipment comprising: a transmitter and a receiver; a synchronization sequence detector for detecting a synchronization sequence in a received signal; a characteristic determiner that, based on information associating each of a plurality of synchronization sequences with a respective common characteristic shared by TRPs that transmit the synchronization sequence, determines a characteristic of a source of the detected synchronization sequence based on the detected synchronization sequence.

In some embodiments, the characteristic determiner is configured to: if the synchronization sequence is a first sequence, determine a high power TRP transmitted the synchronization sequence; if the synchronization sequence is a second sequence, determine a lower power TRP transmitted the synchronization sequence.

In some embodiments, the characteristic determiner is configured to: if the synchronization sequence is a sequence of a first group of synchronization sequences, determine a high power TRP transmitted the synchronization sequence; if the synchronization sequence is a sequence of a second group of synchronization sequences, determine a lower power TRP transmitted the synchronization sequence.

In some embodiments, the UE further comprises a power controller that adjust UE transmit power based on the determination of whether a high power TRP or a low power TRP transmitted the synchronization sequence.

BRIEF DESCRIPTION OF THE DRAWINGS

Embodiments of the disclosure will now be described with reference to the attached drawings in which.

DETAILED DESCRIPTION OF ILLUSTRATIVE EMBODIMENTS

Generally, embodiments of the present disclosure provide a method and system for synchronization in hypercells. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Figure 1:
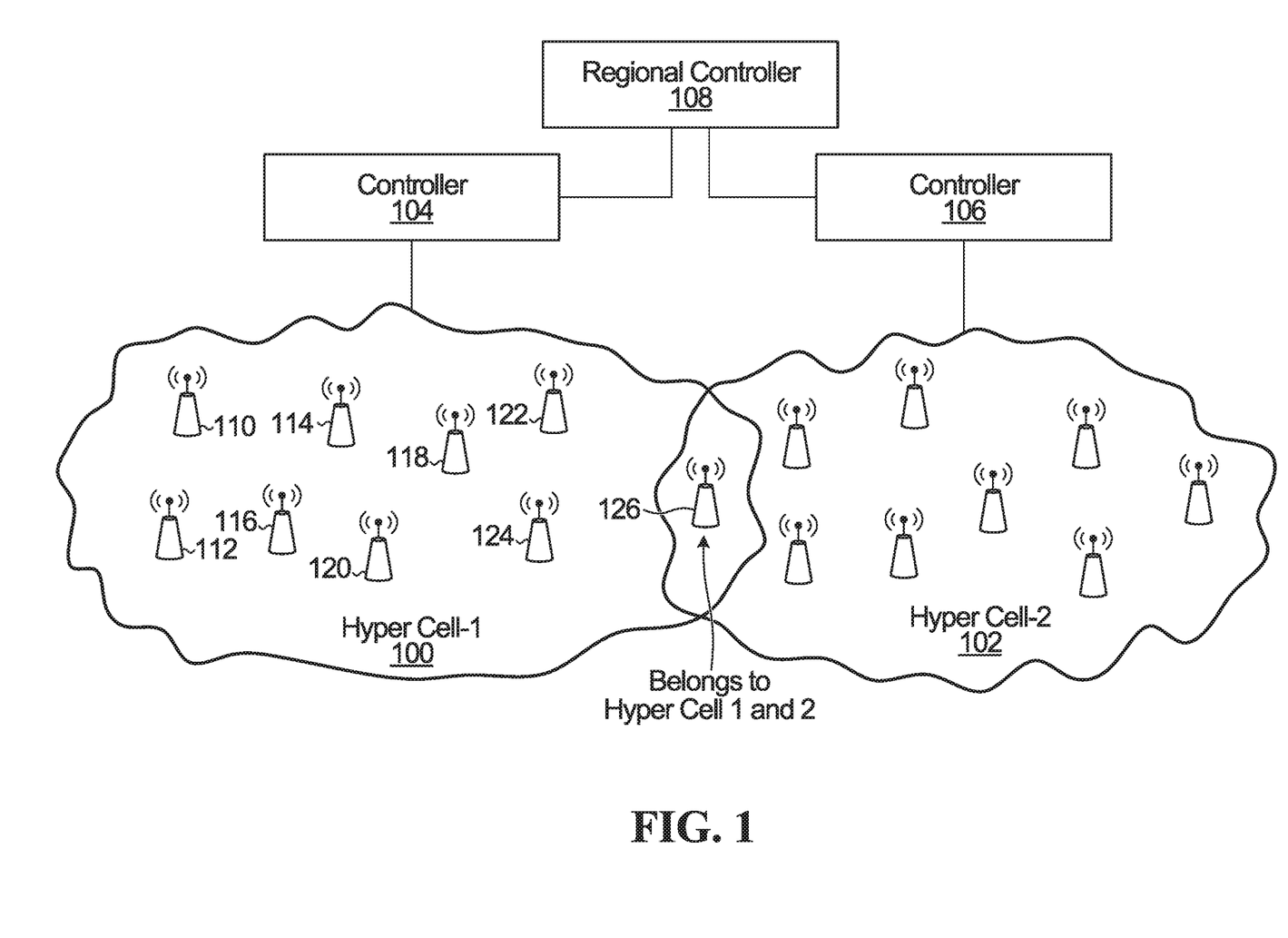
FIG. 1 is a schematic view of a system with two hyper cells each including multiple TRPs according to one embodiment of the present disclosure.

An embodiment of a hypercell-based network is depicted in FIG. 1. Shown is a network with two hypercells 100,102. Each hypercell 100,102 has a respective controller 104,106 connected to a regional controller 108. Each hypercell is a logical entity that covers a group of physical transmit receive points (TRPs). A hypercell may have a configurable coverage area according to network topology, UE distribution and load distribution, for example, and may overlap with a neighbouring hypercell. In the illustrated example, hypercell 100 has TRPs 110,112, . . . , 124. Hypercell 102 also has a group of TRPs, including the TRP 126 that also belongs to hypercell 100. A hypercell contains many TRPs that may be of different types including, for example, macro cells, pico cells, remote radio heads (RRH), and access points.

It should be understood that the network of FIG. 1 is a specific example for illustration purposes. This network will be used as a basis for example implementations of the various embodiments described below, but they are not limited to such application.

A hypercell ID is a logical entity ID that may be assigned to a hypercell. A UE accesses the network and obtains the hypercell ID. All the TRPs in a hypercell have the same hypercell ID. In some embodiments, this ID may represent a physical cell identity where the physical cell is a hypercell that consists of one or multiple TRPs.

According to one embodiment of the present disclosure, each TRP in a hypercell transmits a synchronization sequence to allow UEs to perform synchronization during network access. Synchronization sequences can, for example, be based on a Zadoff-Chu sequence, m- sequence and/or pseudo-noise (PN) sequence. The synchronization sequence may be transmitted as a primary synchronization sequence (PSS) and/or secondary synchronization sequence (SSS). Moreover, the sequence may be transmitted as an additional synchronization sequence such as a tertiary synchronization sequence CSS). The pool of sequences that belongs to a hypercell can be predefined. The pool of sequences is associated with a hypercell ID. In accordance with an embodiment, the TRPs of a hypercell are divided into groups for the purpose of transmitting synchronization sequences. The TRPs in each group of TRPs share a common characteristic. In the particular example described in detail below, the shared common characteristic is high transmit power for a first group and low transmit power for a second group. It should be understood that the examples below are applicable to other shared common characteristics, such as a common operating frequency band, or proximity between TRPs. Each TRP in the same group of TRPs uses the same synchronization sequence. Two TRPs of two differing groups will transmit different synchronization sequences. Different synchronization sequences will be assigned within differing hypercells. It should be understood that, instead of transmitting different synchronization sequences, TRPs of different groups may transmit the same synchronization sequence in different synchronization channels, for example in different time-frequency resources, or in different operating frequency bands. The assignment of synchronization channels to groups of TRPs can be adjusted or configured on a semi-static or dynamic basis.

A hypercell can be regarded as covering a large area that may include many macro cells. The hypercell's coverage area may be configurable by the network.

In one example, at time T1, the network configures N TRPs to form a hypercell. Each of the N TRPs is configured to send either a high power node (HPN) sequence or a low power node (LPN) sequence, according to its characteristic. At a later time T2, the network configures a different set of M TRPs to form a hypercell. Each of the M TRPs is then configured to send these same sequences, according to its characteristic.

In some embodiments, some, but not necessarily all, of the TRPs need to send the sequence(s). For example, within each group of TRPs, a subset of TRPs will send the corresponding sequence(s). The subset of TRPs to transmit at a given instant may be dynamically or semi-statically selected. The selection may be based on, for example, UE locations, as determined by signal strength measurements for example. Other examples of selecting which TRPs to transmit which synchronization sequence may be based on the interference conditions to other TRPs and UEs, and/or the proximity of the TRPs to each other. This is beneficial for interference management because not all TRPs are sending the sequences.

In another example, the network configures N TRPs to form a hypercell. Each of the N TRPs is configured to send either a sequence selected from a set of HPN sequences, or a sequence selected from a set of LPN sequences, according to its characteristic. In this case, for a given hypercell, each TRP can select different sequences from its set for different transmissions. Again, in some embodiments, some, but not necessarily all, of the TRPs need to send the sequence(s). For example, within each group of TRPs, a subset of TRPs will send the corresponding sequence(s). This is beneficial for interference management because not all TRPs are sending the sequences.

In another embodiment, the TRPs of a hypercell are divided into groups for the purpose of transmitting synchronization sequences. The synchronization sequences are divided into different sets, with each set assigned to a TRP group. Within each group of TRPs, each TRP uses synchronization sequences from the set corresponding to that group. The network can configure which sequence from the set each TRP will use for transmission. TRPs of two differing groups will transmit synchronization sequences from different sets corresponding to the differing groups. Again, in some embodiments, some, but not necessarily all, of the TRPs need to send the sequence(s). For example, within each group of TRPs, a subset of TRPs will send the corresponding sequence(s). A technical benefit of this embodiment is improved interference management because not all TRPs are sending the sequences.

Figure 3:
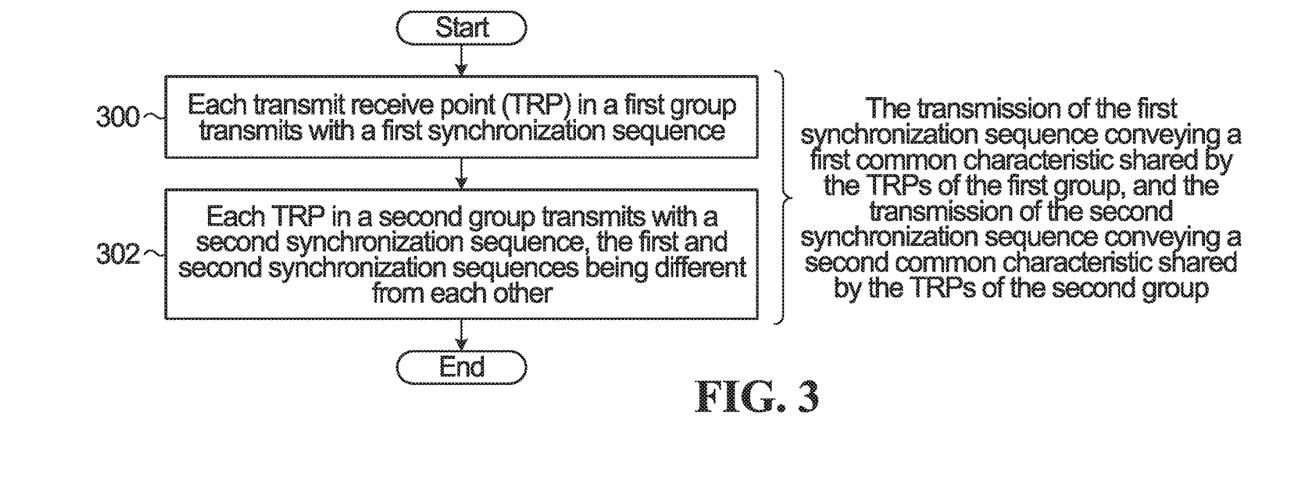
FIG. 3 is a flowchart of a method of transmitting distinct synchronization sequences for multiple groups of TRPs according to one embodiment of the present disclosure.

FIG. 3 is a flowchart of a method to be performed by groups of a TRPs based on distinct synchronization sequences. The method begins in block 300 with each transmit receive point in a first group transmitting with a first synchronization sequence. The method continues in block 302 with each TRP in a second group transmitting with a second synchronization sequence, the first and second synchronization sequences being different from each other. The transmission of the first synchronization sequence conveys a first common characteristic shared by the TRPs of the first group, and the transmission of the second synchronization sequence conveys a second common characteristic shared by the TRPs of the second group. A technical benefit of the method of FIG. 3 from the network perspective is that the common characteristics of the groups of TRPs are conveyed to a UE without additional signalling beyond the synchronization sequences. For example, where TRP groups are formed based on transmit power (HPN vs. LPN), a UE can determine what the transmit power is of the TRP groups based on received synchronization sequence.

Figure 4:
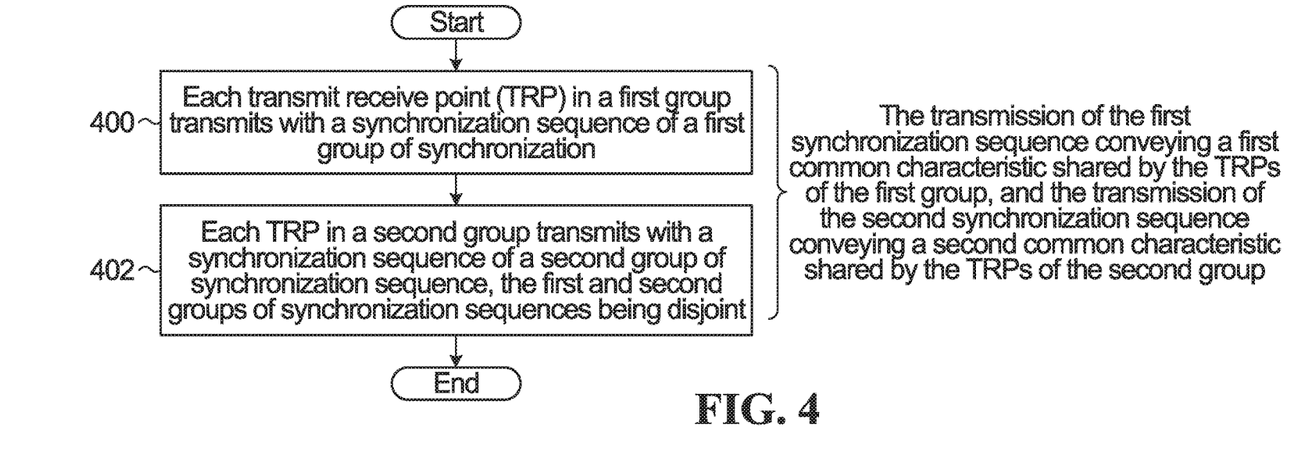
FIG. 4 is a flowchart of a method of transmitting disjoint synchronization sequences for multiple groups of TRPs according to one embodiment of the present disclosure.

FIG. 4 is a flowchart of a method to be performed by groups of TRPs based on disjoint groups of synchronization sequences. The method begins in block 400 with each transmit receive point (TRP) in a first group transmitting with a synchronization sequence of a first group of synchronization sequences. The method continues in block 402 with each TRP in a second group transmitting with a synchronization sequence of a second group of synchronization sequences, the first and second groups of synchronization sequences being disjoint. The transmission of the first synchronization sequence conveys a first common characteristic shared by the TRPs of the first group, and the transmission of the second synchronization sequence conveys a second common characteristic shared by the TRPs of the second group. As in the embodiment of FIG. 3, a technical benefit of the method of FIG. 4 from the network perspective is that the common characteristics of the groups of TRPs are conveyed to a UE without additional signalling beyond the synchronization sequences. The use of disjoint sets of synchronization sequences allows additional flexibility in assigning the synchronization sequences to the TRP groups.

Figure 5:
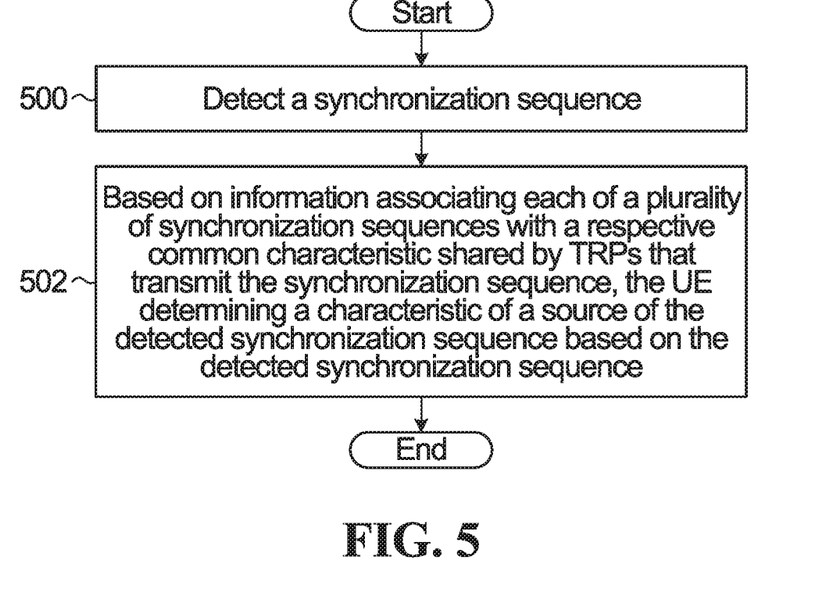
FIG. 5 is a flowchart of a method of determining a characteristic of a source of a detected synchronization sequence based on the detected synchronization sequence according to one embodiment of the present disclosure.

FIG. 5 is a flowchart of a method to be performed by a UE. The method begins in block 500 with a user equipment (UE) detecting a synchronization sequence. The method continues in block 502 with, based on information associating each of a plurality of synchronization sequences with a respective common characteristic shared by TRPs that transmit the synchronization sequence, the UE determining a characteristic of a source of the detected synchronization sequence based on the detected synchronization sequence. A technical benefit of the method of FIG. 5 from the UE perspective is that the common characteristics of the groups of TRPs are determined by a UE without the need for the UE to receive and decode additional signalling beyond the synchronization sequences.

In one embodiment, the TRP groups are formed based on transmit power. A first TRP group is defined that includes all the high power nodes (HPN). This might, for example include macro cells. A second TRP group is defined that includes all low power nodes (LPN). These might, for example, include pico cells, and access points. More generally, what constitutes an HPN as opposed to an LPN can be defined on an implementation specific basis.

Because the TRPs of each group of TRPs share a common characteristic, a transmission of one of the synchronization sequences by one or more of the TRPs is indicative of the common characteristic of the group of TRPs to which the TRP belongs.

Where the common characteristic is high power or low power, with this approach, the differing synchronization signals can be used by the UE to distinguish HPNs from LPNs.

A UE attempting to access the network will detect one or more synchronization signals. Based on the detected synchronization signals, the UE can determine the TRP group (e.g. HPN or LPN) of the entity that transmitted the synchronization signal.

An embodiment method of synchronization and determining the TRP group of an entity will now be described.

a. A UE is configured in advance with the predefined synchronization sequences it needs to be aware of. This includes an association of each synchronization sequence with HPN transmission or LPN transmission. The association can be specified in the form of tables and/or equations with appropriate parameter sets. For example, this may involve the association of different parameter sets of ZC sequence roots and/or cyclic shifts to HPN or LPN transmission when the sequences are ZC sequences. When the sequences are m-sequences, this may involve the association of different parameter sets of m-sequence indices and/or cyclic shifts to HPN or LPN transmission.

b. One or more TRPs will transmit a synchronization sequence.

c. A UE detects the transmitted synchronization sequence by correlating with the known, predefined synchronization sequences. The UE can identify and make use of any detected synchronization sequence that exceeds a received power threshold or is otherwise sufficient. This detection procedure can be part of the primary and/or secondary synchronization signal detection if the sequences are part of the PSS and/or SSS. In this case, it occurs together with the physical cell identity detection. In another embodiment, this detection procedure can be part of the additional synchronization signal detection (for example where the sequences are part of the TSS).

d. Based on the identified synchronization sequence, the UE can determine the group to which the TRP belongs, e.g. whether the TRP or TRPs that transmitted the sequence is a HPN or LPN.

e. Because each synchronization sequence is a known signal, the synchronization sequence can act as a pilot signal. The received power can he measured, and the pathloss can be calculated, based on whether the synchronization sequence was transmitted by a HPN or LPN.

f. The initial transmit power of the UE for uplink transmission (e.g. the first uplink message in a random access procedure) can be determined based on the calculated pathloss.

Alternatively, the UE can determine whether a detected synchronization sequence is from an HPN or an LPN. The UE can set its initial transmit power based on predefined values for transmit power to HPNs or to LPNs. This can be done without measuring the receive power or calculating the pathloss.

In some embodiments, the initial power control for sending an uplink transmission, for example a transmission for initial access, is based on the determined TRP group.

Figure 2:
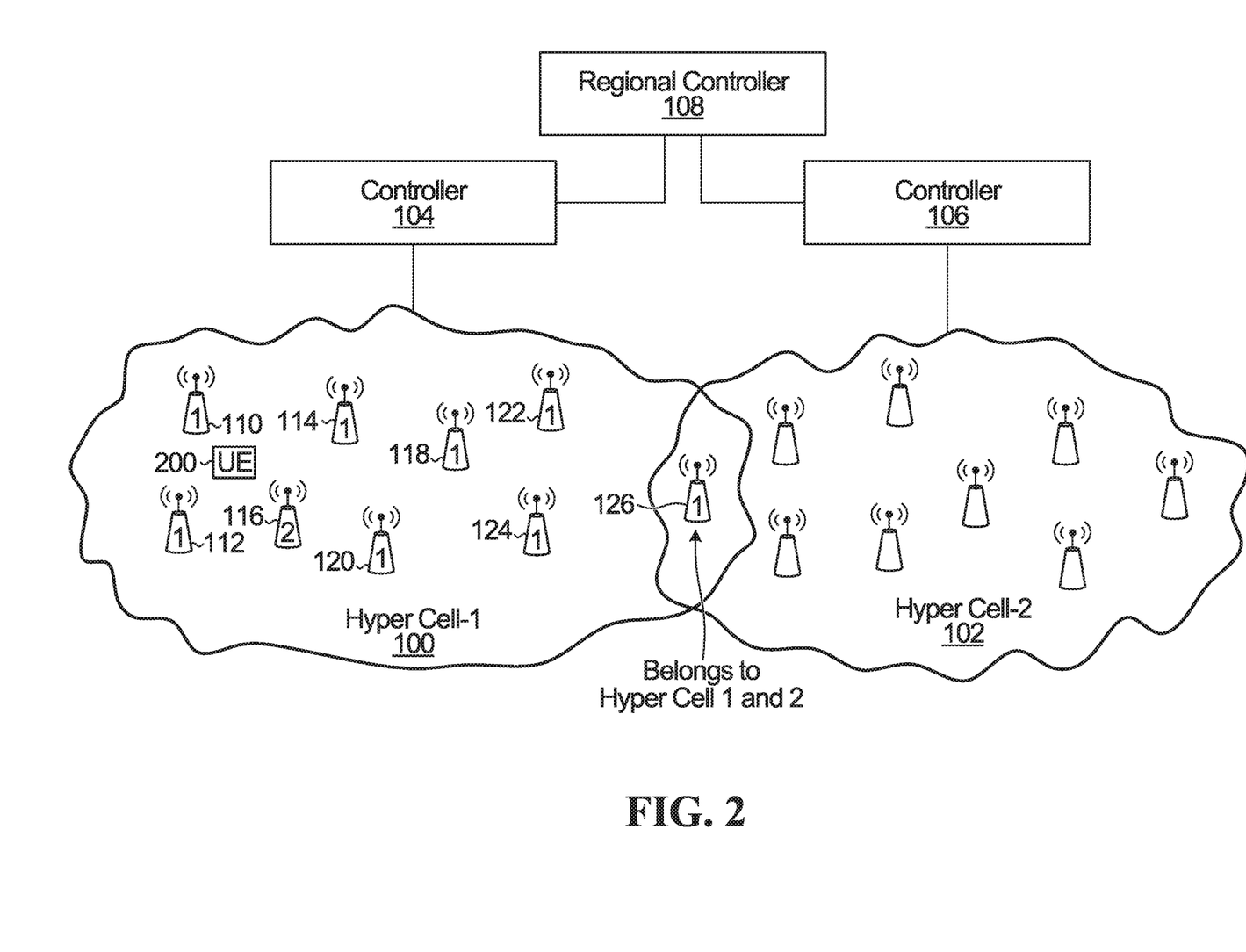
FIG. 2 shows the system of FIG. 1 with the TRPs of one hyper cell assigned to one of two groups according to one embodiment of the present disclosure.

An example will now be described with reference to FIG. 2. In this example, TRPs 110, 112, 114, 118, 120, 122, 124, 126 are all LPN, and are labelled "1" to indicate they all transmit a first synchronization signal. TRP 116 is an HPN, and is labelled "2" to indicate it transmits a second synchronization signal.

As detailed above, in some embodiments, the UE calculates path loss taking into account a known transmit power, determined based on the TRP group.

For example, with reference again to FIG. 2, an LPN TRP 110 transmits the LPN synchronization sequence at 23 dBm that is received by the UE with a signal strength of 13 dBm, and an HPN TRP 116 transmits the HPN synchronization sequence at 43 dBm that is received by the UE with a signal strength of 20 dBm. The UE can determine the path loss to the LPN TRP 110 as 23−13=10 dBm, and can determine the path loss to the HPN TRP 116 as 43−20=23 dBm. Based on the determined path loss, the UE can distinguish between a closer low-power TRP and a more distant high-power TRP, and thereby determine the distance to the TRP and adjust its initial transmit power accordingly to communicate with that TRP.

After setting the initial power, ramp up and ramp down mechanisms may be applied to further adjust the transmit power. However, setting the initial power based in this manner can reduce latency in initial system access.

In a conventional OFDM system, the synchronization sequence begins with a cyclic prefix (CP) and ends with a guard period. This configuration can mitigate the effects of the delay spread of the channel and the propagation delay within a certain distance. Any copy of the signal beyond the CP and guard time can be treated as interference. A lower initial power can also reduce uplink interference.

In some embodiments, a hypercell consists of different kinds of TRPs, including TRPs transmitting and receiving in different frequency bands (e.g. carrier frequency under 6 GHz, 30 GHz etc.). TRPs operating in sufficiently different carrier frequencies can transmit the same synchronization sequence without interfering with each other. In some embodiments, the same synchronization sequences are used at different system frequencies to distinguish between groups of TRPs. For example, in a system with a 2 GHz carrier frequency, a first synchronization sequence (or set of sequences) is associated with LPN, and a second synchronization sequence (or set of sequences) is associated with HPN. For a 30 GHz carrier frequency, the same first and second sequences (or sets of sequences) are again associated with LPN and HPN.

In some embodiments, two groups of TRPs can use the same synchronization sequence (or same set of synchronization sequences), and instead use different transmit frequencies to distinguish between TRPs of different groups. For example, a first group of TRPs corresponding to HPNs could transmit a synchronization sequence (or one of a set of synchronization sequences) at a 2 GHz carrier frequency, and a second group of TRPs corresponding to LPNs could transmit the same synchronization sequence (or one of the same set) at a 30 GHz carrier frequency. A UE detecting a synchronization signal could determine whether the transmitting TRP is an HPN or an LPN based on the carrier frequency.

Figure 6:
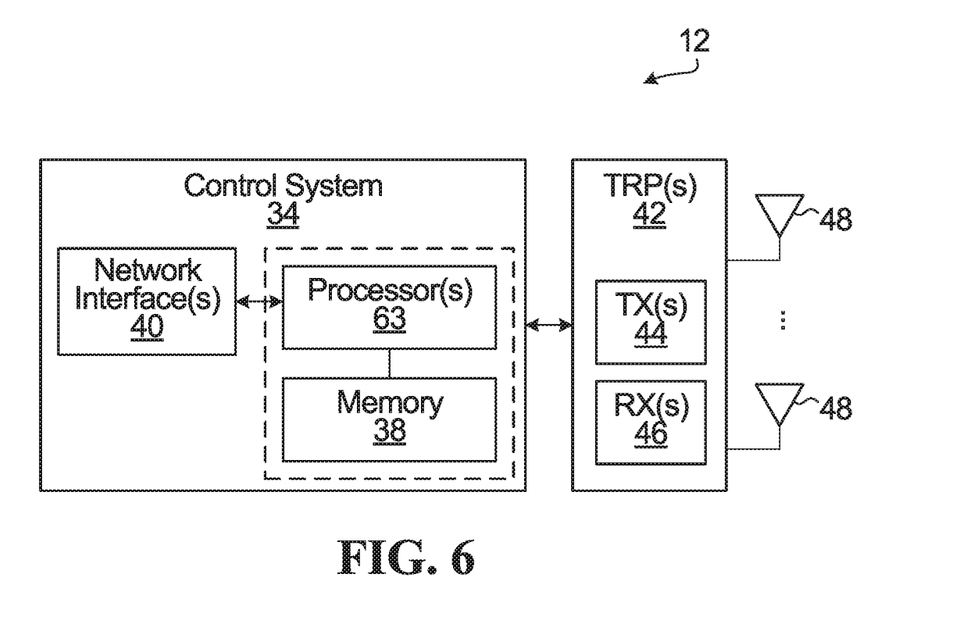
FIGS. 6 is a block diagram of a hyper cell according to one embodiment of the present disclosure.

FIG. 6 is a schematic block diagram of a hyper cell 12 configured to perform one or more of the methods described herein. The hyper cell includes a control system 34 and one or more TRPs 42. In some implementations, the control system 34 is in the form of circuitry configured to perform the access node functions. In yet other implementations, the control system or circuitry 34 includes one or more processors 36 (e.g., CPUs, ASICs, FPGAs, and/or the like) and memory 38 and possibly a network interface 40. Each TRP 42 includes one or more transmitters 44 and one or more receivers 46 coupled to one or more antennas 48. In some other implementations, the functionality of the control system 34 described herein may be fully or partially implemented in software or modules that is, e.g., stored in the memory 38 and executed by the processor(s) 36.

In yet other implementations, a computer program including instructions which, when executed by at least one processor, causes the at least one processor to carry out the functionality of the hyper cell 12 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

Figure 7A:
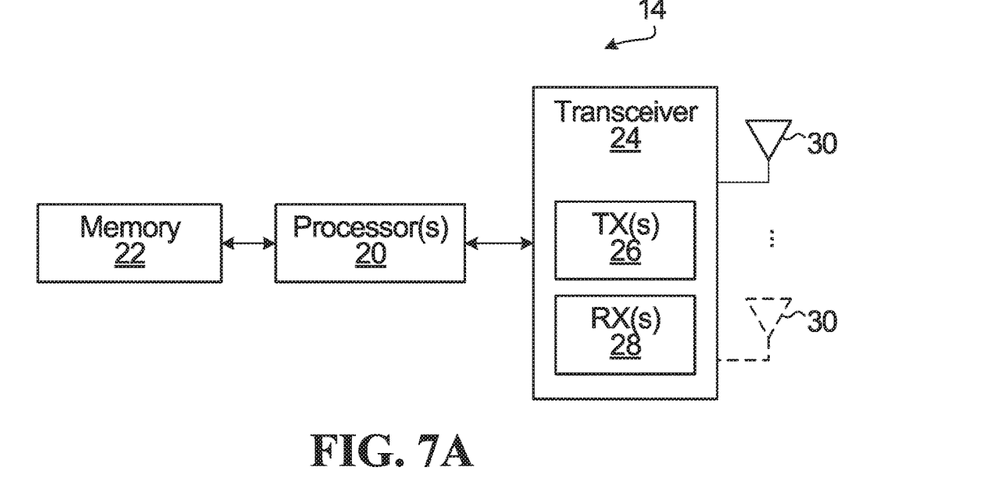
FIGS. 7A and 7B are block diagrams of a wireless device according to embodiments of the present disclosure.

FIG. 7A is a schematic block diagram of a wireless device 14 according to some embodiments of the present disclosure. As illustrated, the wireless device 14 includes one or more processors 20 and memory 22. The wireless device 14 also includes one or more transceivers 24 each including one or more transmitters 26 and one or more receivers 28 coupled to one or more antennas 30. In some other implementations, the functionality of the wireless device 14 described herein may be fully or partially implemented in software or modules that is, e.g., stored in the memory 22 and executed by the processor(s) 20.

Figure 7B:
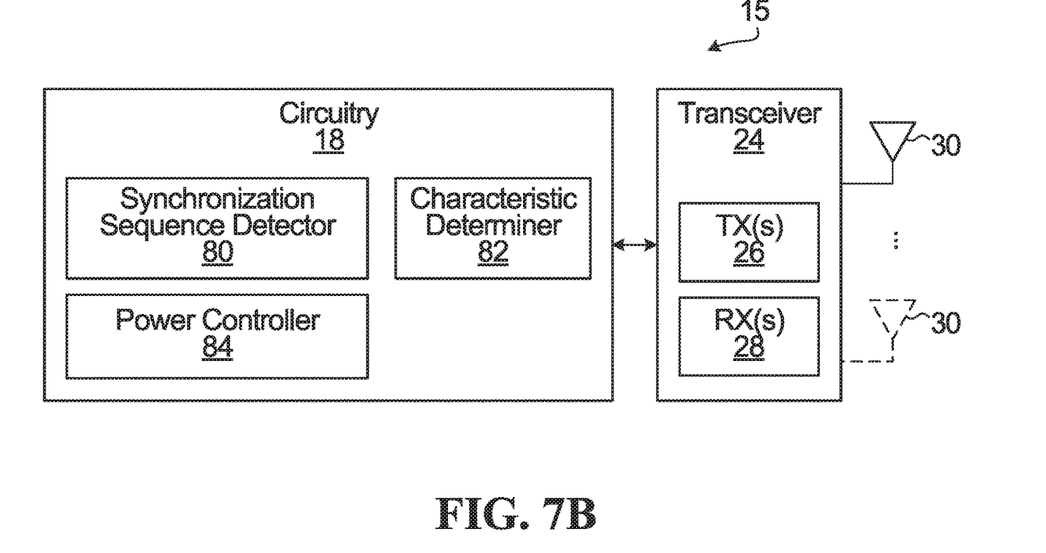

FIG. 7B is a schematic block diagram of a wireless device 15 according to some embodiments of the present disclosure. The wireless device 15 includes circuitry 18 comprising a synchronization sequence detector 8o that performs synchronization sequence detection as described herein. There is a characteristic determiner 82 that makes a determination of a characteristic of a source of a detected synchronization sequence based on the detected sequence, for example high power or low power. In some embodiments, the wireless device further includes a power controller 84 that adjusts transmit power based on the determined characteristic. As with the wireless device 14 of FIG. 7A, the wireless device 15 of FIG. 7B also includes one or more transceivers 24 each including one or more transmitters 26 and one or more receivers 28 coupled to one or more antennas 30.

In yet other implementations, a computer program including instructions which, when executed by at least one processor, causes the at least one processor to carry out the functionality of the wireless device 14 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method comprising:
   receiving, by a user equipment (UE), a first synchronization sequence from at least one transmit receive point (TRP) in a first group of TRPs and a second synchronization sequence from at least one TRP in a second group of TRPs; and
   determining, by the UE, that the first group of TRPs shares a first characteristic and that the second group of TRPs shares a second characteristic based on the first synchronization sequence and the second synchronization sequence without relying on additional signaling in the determining, the first characteristic being different than the second characteristic, wherein the first synchronization sequence and the second synchronization sequence are associated with a shared hypercell identifier (ID).

2. The method of claim 1, wherein the determining comprises:
   determining that the first group of TRPs consists of high-power TRPs and the second group of TRPs consists of low-power TRPs based on the first synchronization sequence and the second synchronization sequence.

3. The method of claim 1, further comprising:
   adjusting power control for the first group of TRPs by a different amount than the second group of TRPs based on the determining that the first group of TRPs shares the first characteristic and that the second group of TRPs shares the second characteristic.

4. The method of claim 3, wherein the adjusting the power control comprises adjusting initial transmit power.

5. The method of claim 1, wherein the determining comprises:
   determining that the first group of TRPs consists of high-power TRPs and that the second group of TRPs consists of low-power TRPs based on values of the first synchronization sequence and the second synchronization sequence, the first synchronization sequence having a different value than the second synchronization sequence.

6. The method of claim 1, wherein the determining comprises:
   determining that the first group of TRPs consists of high-power TRPs and that the second group of TRPs consists of low-power TRPs based on time-frequency resources over which the first synchronization sequence and the second synchronization sequence are received, the first synchronization sequence being received over a different time-frequency resource than the second synchronization sequence.

7. The method of claim 1, wherein the determining comprises:
   determining that the first group of TRPs consists of high-power TRPs and that the second group of TRPs consists of low-power TRPs based on operating frequencies of the first synchronization sequence and the second synchronization sequence, the first synchronization sequence having a different operating frequency than the second synchronization sequence.

8. The method of claim 1, the determining comprising: determining that the first group of TRPs shares the first characteristic and that the second group of TRPs shares the second characteristic based on a first resource over which the first synchronization sequence is received and a second resource over which the second synchronization sequence is received, the first resource being different than the second resource.

9. The method of claim 1, wherein the first synchronization sequence is assigned to the first group of TRPs and the second synchronization sequence is assigned to the second group of TRPs.

10. The method of claim 1, the determining comprising: determining that the first characteristic is high transmit power for the first group of TRPs and that the second characteristic is low transmit power for the second group of TRPs based on the first synchronization sequence and the second synchronization sequence.

11. A user equipment (UE) comprising:
at least one processor; and
a non-transitory computer readable storage medium storing programming for execution by the at least one processor, the programming including instructions to:
receive a first synchronization sequence from at least one transmit receive point (TRP) in a first group of TRPs and a second synchronization sequence from at least one TRP in a second group of TRPs; and
determine that the first group of TRPs shares a first characteristic and that the second group of TRPs shares a second characteristic based on the first synchronization sequence and the second synchronization sequence without relying on additional signaling in determining that the first group of TRPs shares the first characteristic and that the second group of TRPs shares the second characteristic, the first characteristic being different than the second characteristic, wherein the first synchronization sequence and the second synchronization sequence are associated with a shared hypercell identifier (ID).

12. The UE of claim 11, wherein the instructions to determine that the first group of TRPs shares the first characteristic and that the second group of TRPs shares the second characteristic based on the first synchronization sequence and the second synchronization sequence include instructions to:
determine that the first group of TRPs consists of high-power TRPs and the second group of TRPs consists of low-power TRPs based on the first synchronization sequence and the second synchronization sequence.

13. The UE of claim 11, wherein the programming further includes instructions to:
adjust power control for the first group of TRPs by a different amount than the second group of TRPs based on determination that the first group of TRPs shares the first characteristic and that the second group of TRPs shares the second characteristic.

14. The UE of claim 13, wherein the instructions to adjust the power control include instructions to:
adjust initial transmit power.

15. The UE of claim 11, wherein the instructions to determine that the first group of TRPs shares the first characteristic and that the second group of TRPs shares the second characteristic based on the first synchronization sequence and the second synchronization sequence include instructions to:
determine that the first group of TRPs shares the first characteristic and that the second group of TRPs shares the second characteristic based on values of the first synchronization sequence and the second synchronization sequence, the first synchronization sequence having a different value than the second synchronization sequence.

16. The UE of claim 11, wherein the instructions to determine that the first group of TRPs shares the first characteristic and that the second group of TRPs shares the second characteristic based on the first synchronization sequence and the second synchronization sequence include instructions to:
determine that the first group of TRPs shares the first characteristic and that the second group of TRPs shares the second characteristic based on time-frequency resources over which the first synchronization sequence and the second synchronization sequence are received, the first synchronization sequence being received over a different time-frequency resource than the second synchronization sequence.

17. The UE of claim 11, wherein the instructions to determine that the first group of TRPs shares the first characteristic and that the second group of TRPs shares the second characteristic based on the first synchronization sequence and the second synchronization sequence include instructions to:
determine that the first group of TRPs shares the first characteristic and that the second group of TRPs shares the second characteristic based on operating frequencies of the first synchronization sequence and the second synchronization sequence, the first synchronization sequence having a different operating frequency than the second synchronization sequence.

18. A computer program product comprising a non-transitory computer readable storage medium storing programming, the programming including instructions that, when executed by a user equipment (UE), cause the UE to perform operations, the operations comprising:
receiving a first synchronization sequence from at least one transmit receive point (TRP) in a first group of TRPs and a second synchronization sequence from at least one TRP in a second group of TRPs; and
determining that the first group of TRPs shares a first characteristic and that the second group of TRPs shares a second characteristic based on the first synchronization sequence and the second synchronization sequence without relying on additional signaling in the determining, the first characteristic being different than the second characteristic, wherein the first synchronization sequence and the second synchronization sequence are associated with a shared hypercell identifier (ID).

19. The computer program product of claim 18, wherein the determining comprising:
determining that the first group of TRPs consists of high-power TRPs and the second group of TRPs consists of low-power TRPs based on the first synchronization sequence and the second synchronization sequence.

20. The computer program product of claim 18, wherein the operations further comprising:
adjusting power control for the first group of TRPs by a different amount than the second group of TRPs based on determination that the first group of TRPs shares the first characteristic and that the second group of TRPs shares the second characteristic.

21. The computer program product of claim 20, wherein the adjusting the power control comprises adjusting initial transmit power.

22. The computer program product of claim 18, wherein the determining comprises:
   determining that the first group of TRPs shares the first characteristic and that the second group of TRPs shares the second characteristic based on values of the first synchronization sequence and the second synchronization sequence, the first synchronization sequence having a different value than the second synchronization sequence.

23. The computer program product of claim 18, wherein the determining comprises:
   determining that the first group of TRPs shares the first characteristic and that the second group of TRPs shares the second characteristic based on time-frequency resources over which the first synchronization sequence and the second synchronization sequence are received, the first synchronization sequence being received over different a time-frequency resource than the second synchronization sequence.

24. The computer program product of claim 18, wherein the determining comprises:
   determining that the first group of TRPs shares the first characteristic and that the second group of TRPs shares the second characteristic based on operating frequencies of the first synchronization sequence and the second synchronization sequence, the first synchronization sequence having a different operating frequency than the second synchronization sequence.

\* \* \* \* \*